United States Patent [19]

Otake et al.

[11] Patent Number: 4,828,473
[45] Date of Patent: May 9, 1989

[54] INJECTION CONTROL APPARATUS FOR AN INJECTION-MOLDING MACHINE

[75] Inventors: Hiromasa Otake, Tanashi; Toshio Kobayashi, Hino, both of Japan

[73] Assignee: Fanuc Ltd., Yamanashi, Japan

[21] Appl. No.: 131,048

[22] PCT Filed: Mar. 20, 1987

[86] PCT No.: PCT/JP87/00174
§ 371 Date: Nov. 19, 1987
§ 102(e) Date: Nov. 19, 1987

[87] PCT Pub. No.: WO87/05559
PCT Pub. Date: Sep. 24, 1987

[30] Foreign Application Priority Data

Mar. 20, 1986 [JP] Japan ................... 61-60873

[51] Int. Cl.⁴ ........................................... B29C 45/77
[52] U.S. Cl. .................... 425/145; 264/40.3; 264/40.7; 425/149
[58] Field of Search ............ 425/145, 149, 169; 264/40.3, 40.7

[56] References Cited

U.S. PATENT DOCUMENTS 3,859,400 1/1975 Ma ............................ 425/145
3,932,083 1/1976 Boettner .................... 425/145

FOREIGN PATENT DOCUMENTS 125826 6/1986 Japan .
169220 7/1986 Japan .

Primary Examiner—Jay H. Woo
Assistant Examiner—Timothy W. Heitbrink
Attorney, Agent, or Firm—Staas & Halsey

[57] ABSTRACT

Disclosed herewith is an injection control apparatus which is used for an injection-molding machine that is subjected to injection and hold pressure controls by means of a numerical control unit (30), and which controls the switching from the injection control to the hold pressure control based on the injection time and resin pressure so as to improve the operation reliability of the injection-molding machine and ensures production of good-quality molded articles.

When the pressure on the resin filled in a mold that is detected by pressure detection means (26) exceeds preset pressure or when a predetermined time elapses after the start of the injection operation, hold pressure control means (30, 50, 60) starts the hold pressure control. When pulse distribution to a hold end position is not completed upon completion of the hold pressure control, an error register (51) of a servo circuit (50) is followed up by follow-up means (30) so that the pulse distribution is forcibly executed.

13 Claims, 6 Drawing Sheets

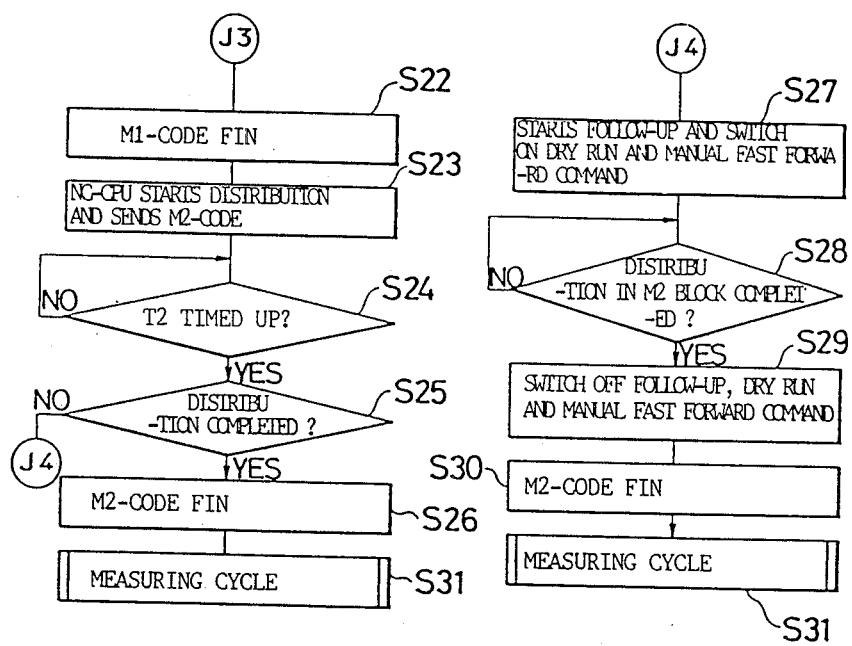

INJECTION CONTROL APPARATUS FOR AN INJECTION-MOLDING MACHINE

TECHNICAL FIELD

The present invention relates to an injection molding machine and more particularly to an injection control apparatus for an injection-molding machine, which is adapted to perform injection/hold pressure control with a numerical control unit.

BACKGROUND ART

According to the injection/hold pressure control in an injection-molding machine, when a predetermined switching condition is satisfied, injection speed control is switched to hold pressure control and pressure holding is executed over a predetermined period of time thereafter, and then the process continues to the next measuring block. There are two systems for switching from the speed control to the hold pressure control: the first system uses a screw position as a control parameter to switch the control to the hold pressure control when a screw reaches an injection/hold pressure switching position, and the second one uses an injection time as the control parameter to perform the switching to the hold pressure control when a predetermined time elapses from the start of the injection.

Conventionally, in controlling an injection molding machine with a numerical control unit (hereinafter referred to as an NC unit), the switching to the hold pressure control has been done by the first switching system that involves the screw position. However, when a screw cannot inject resin at a set injection speed due to a large viscosity of resin or for some other reason and the screw does not, as a consequence, reach the injection/hold switching position within a predetermined time from the beginning of the injection control, the injection cycle becomes long, thus deteriorating the production efficiency. In this case, because the screw does not move as instructed by a speed command, a move command is accumulated in an error register in an NC unit and this value may exceed a given amount so that the NC unit stops a pulse distribution and the overall injection-molding machine stops functioning.

Further, in an injection-molding machine which is subjected to injection control by means of the NC unit, the following problem would occur when the injection/hold pressure control is performed based on the injection time.

When the injection speed control stage approaches its end and the amount of resin filled in a mold increases, the pressure on the resin gradually increases so that this pressure may reach an excess value corresponding to the maximum torque of a servomotor which drives the injection device before the switching to the hold pressure control is executed. In this case, excess pressure is applied on the resin, thus undesirably causing burrs or cracks in a molded article.

DISCLOSURE OF THE INVENTION

It is, therefore, an object of this invention to provide an injection control apparatus for an injection-molding machine for executing an injection operation under the control of an NC unit, which control apparatus controls the switching from the injection speed control to the hold pressure control based on both of the injection time and the pressure acting on resin, so as to improve the operational reliability of the injection-molding machine as well as produces good-quality molded articles.

To achieve the above object, there is provided an injection control apparatus for an injection-molding machine for performing injection control using a servomotor that is controlled by a numerical control unit, which apparatus comprises:

pressure detection means for detecting pressure applied on resin in a mold;

an injection high-timer for counting a predetermined time after injection starts and outputting a time-up signal upon elapse of the predetermined time;

comparison means for comparing the pressure detected by the pressure detection means with preset pressure and outputting an output signal when the detected pressure is higher than the preset pressure;

hold pressure control means for starting hold pressure control in response to the time-up signal from the injection high-timer or the output signal from the comparison means; and follow-up means for following up an error register of a servo circuit for driving the servomotor when a pulse distribution to a hold end position is not completed at the time the hold pressure control is completed, so as to forcibly complete the pulse distribution.

As should be clear from the above, according to this invention, in an injection-molding machine that is controlled by a numerical control unit, switching from the injection control to the hold pressure control is executed in accordance with an injection time or pressure applied on resin in a mold, so that no excess pressure would be applied on the resin to thereby provide a molded article with a good quality and the cycle time of the injection-molding operation would not become significantly large. Further, when the pulse distribution to the hold end position has not been completed upon completion of the hold pressure control, the follow-up means follows up an undistributed pulse to permit the processing of the next block. It is therefore possible to keep the injection-molding machine operating.

BRIEF DESCRIPTION OF THE DRAWINGS

FIGS. 4A to 4F are operation flowcharts for the injection control apparatus according to the embodiment.

BEST MODE OF CARRYING OUT THE INVENTION

Figure 1:
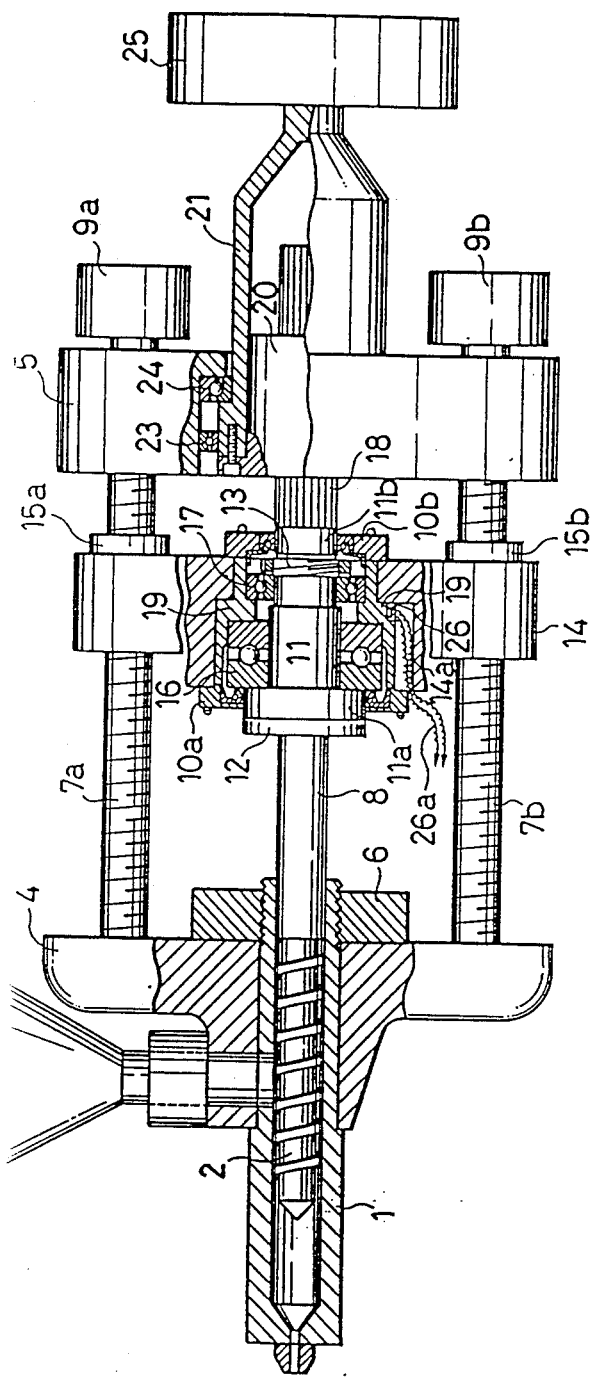
FIG. 1 is a side elevation view, partially in selection illustrating where a pressure sensor of an injection control apparatus according to one embodiment of this invention is mounted to an injection-molding machine.

FIG. 1 illustrates an injection device for an injection-molding machine provided with an injection control apparatus according to one embodiment of this invention. In FIG. 1 a front plate 4 and a rear plate 5 are fixed to the base (not shown) of the injection-molding machine. A heat cylinder 1 into which a screw 2 is fitted is fixed to the front plate 4 by means of a barrel nut 6. Numeral 3 denotes a hopper through which a molding material is disposed in the heat cylinder 1. A screw shaft 8 of the screw 2 is rotatably supported by a pusher plate 14 through a screw sleeve 11, a screw retainer 12 and a nut 13, etc. The screw sleeve 11 is rotatably supported by the pusher plate 14 through a thrust bearing 16 and a radial bearing 17. The screw sleeve 11 is so fixed to the pusher plate 14 as to be axially immovable relative to this plate. More specifically, a flange 11a formed at the front end of the plate 14 grabs a bearing retainer 19 fixed to the pusher plate 14 through the bearings 16 and 17 in cooperation with the nut 13 that engages with a screw 11b formed at the rear end portion of the plate. In other words, the sleeve 11 is fixed to the plate 14 in such a manner as to be immovable in the axial direction of the plate 14. The screw shaft 8 is fixed to the screw sleeve 11 by the screw retainer 12. At the rear end surface of the screw sleeve 11 is fixed a spline shaft 18 to transmit the rotational moment of the spline shaft 18 to the screw shaft 8 through the screw sleeve 11. The spline shaft 18 is engaged with a nut 20 having internal teeth to engage with the teeth of the spline shaft 18. The nut 20 is bolted to a rotation driver tube 21 which is rotatably supported by the rear plate 5 through bearings 23 and 24. A pulley 25 is fixed to the rear end of the tube 21 by means of a key or the like, and is rotatable by a metering/mixing motor (not shown).

The pusher plate 14 is reciprocatively guided by four tie rods (not shown) that are provided between the front plate 4 and the rear plate 5. And to this pusher plate 14 are fixed two ball nuts 15a and 15b that respectively engage with two ball screws 7a and 7b, which are rotatably provided between the front plate 4 and the rear plate 5 in a symmetrical fashion to each other with respect to the axis of the screw 8. Pulleys 9a and 9b are respectively fixed to distal ends of these two ball screws 7a and 7b and are adapted to be rotated by an injection servomotor M (see FIG. 2) through a timing belt (not shown). Numerals 10a and 10b denote retainers.

The injection control apparatus is further provided with an adhesion strain gauge 26 serving as a pressure sensor to detect pressure applied on resin filled in a mold (not shown).

The pressure sensor may be of a type that is inserted into a mold cavity section to directly detect the pressure on resin in the mold. However, such a sensor is expensive so that this embodiment employs the strain gauge 26 which is adhered to the bonding section between the screw 8 and the pusher plate 14 that drives the screw in the axial direction, and specifically to the outer surface of a annular intermediate wall of the bearing retainer 19. This strain gauge 26, which may be a well-known resistance type strain gauge, is provided to output an electric signal representing the pressure applied on the resin as will be described later. Lead lines 26a of the gauge extend to the outside through a cutaway section 14a of the pusher plate 14 and are coupled to a strain gauge amplifier 27 (see FIG. 2).

The operation of the injection device will now be briefly described. At the time of performing an injection operation, the injection servomotor M is driven to rotate the ball screws 7a and 7b through the pulleys 9a and 9b so that the pusher plate 14 is moved forward through the nuts 15a and 15b engaged with the ball screws. As a result, the screw 2 moves forward to carry out the injection operation. After the injection is completed, the process advances to the hold pressure control and the screw 2 is depressed with preset hold pressure by driving the injection servomotor M. During the injection and hold pressure operations, the pressure or reactive force from the resin is applied to the bearing retainer 19 through the screw sleeve 11 and deformation occurs to the retainer according to the resin pressure This deformation is detected by the strain gauge 26, and as a result, the pressure applied on the resin can be detected.

Figure 2:
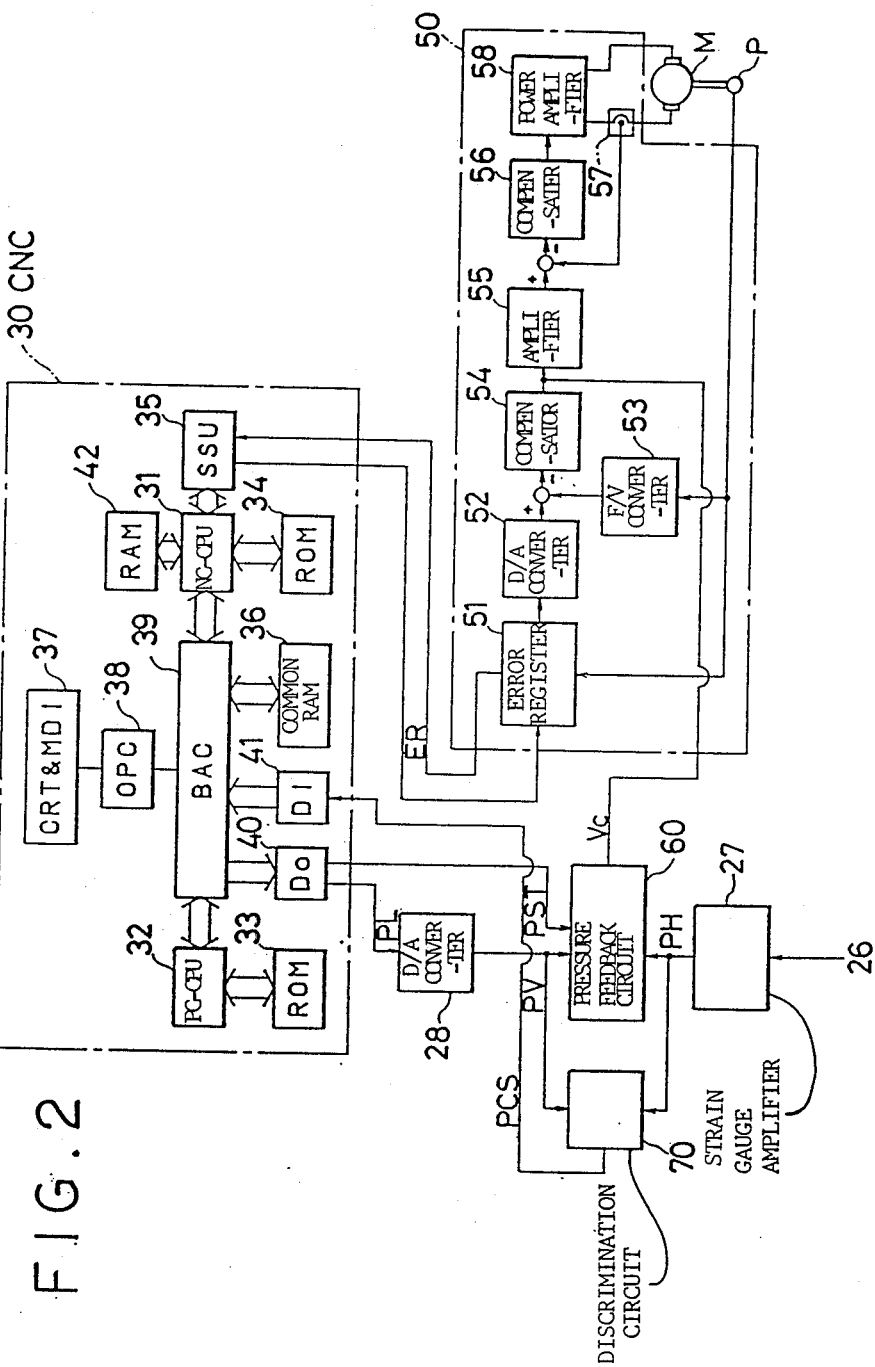
FIG. 2 is a block diagram illustrating the essential portion of a control section of the injection control apparatus according to the embodiment.

FIG. 2 is a block diagram illustrating the essential portion of the control section of the injection control apparatus according to this embodiment. Numeral 30 denotes a numerical control unit with a computer (hereinafter referred to as CNC) as control means for controlling the injection-molding machine. Numeral 50 denotes a servo circuit for the injection servomotor M.

The CNC 30 has a microprocessor (hereinafter referred to as CPU) 31 and a CPU 32 for a programmable controller (hereinafter referred to as PCCPU). The PCCPU 32 is coupled to a ROM 33 which stores individual sequence programs for the injection control and the like of the injection-molding machine. The NCCPU 31 is coupled to a ROM 34, which stores a management program for performing a general control operation of the injection-molding machine, and is also coupled through a servo-interface 35 to servo circuits that control servomotors of the individual axes for injection, clamping, screw-rotation, ejector, etc. FIG. 2 illustrates only the servo circuit 50 that controls the injection servomotor M.

Numeral 36 is a non-volatile common RAM which stores programs for controlling various operations of the injection-molding machine and various set values and parameters such as the set times for an injection high-timer T1 and hold timer T2 to be described later, the injection/hold switching pressure as a condition to discriminate the start of pressure feedback control, a rapid feed rate, the injection speeds, injection speed switching positions and hold pressure (torque limit value) at individual injection/hold pressure control stages. Numeral 37 is an MDI/CRT that is coupled through an operator panel controller 38 to a bus-arbiter controller (hereinafter referred to as BAC) 39 to which the NCCPU 31, the PCCPU 32, a common RAM 36, an output circuit 40 and an input circuit 41 are coupled through the respective buses. The output circuit 40, which is coupled to the D/A converter 28 and a pressure feedback circuit 60, is arranged to output a pressure command value PL for controlling the output torque of the servomotor M and a pressure feedback control select command PST to the D/A converter 28 and the pressure feedback circuit 60, respectively. The input circuit 41 is coupled to the discrimination circuit 70 and receives an injection/hold switching signal PCS that is output from discrimination circuit 70 when the pressure on the resin detected by the strain gauge 26 exceeds a preset value, as will be described later. The strain gauge amplifier 27 is adapted to amplify the signal from the strain gauge 26 and output the amplified signal to the pressure feedback circuit 60.

The servo circuit 50, which is of a known type, has an error register 51 which is so arranged that, when a move command constituted by a pulse train output from the CNC 30 is input through the servo-interface 35 of the CNC 30 to the servo circuit 50 as a required moving amount per unit time, it calculates the difference between the amount indicated by the move command and the moved amount of the servomotor M detected by an encoder P and then converts the calculated value into an analog voltage in an D/A converter 52 as a speed command value. Further, this servo circuit utilizes a speed feedback to improve a response characteristic.

Specifically, the voltage corresponding to the actual speed of the servomotor that has been attained by converting the signal from an encoder P in an F/V converter 53 is subtracted from the above speed command value, and this subtraction result, i.e., the difference between the instructed speed and the actual speed, is amplified in a compensator 54 to provide a torque command or a voltage corresponding to a current value that should flow through the armature of the servomotor M. And, together with this torque command, the output of the pressure feedback circuit 60 is input to an amplifier 55 so as to control the output torque of the servomotor M in accordance with the resin pressure. Further, to improve the response with respect to the output of the amplifier 55, a voltage corresponding to the armature current is fed back from a current detector 57 which detects that armature current, the difference between the output torque command and the feedback signal is amplified by the compensator 5 and a power amplifier 58 to provide a control signal and this control signal is used to control the driving of the servomotor M. A value ER of the error register 51 of the servo circuit 50 is supplied to the CNC 30 through the servo-interface 35 so that the CNC 30 can detect an error amount.

Figure 3:
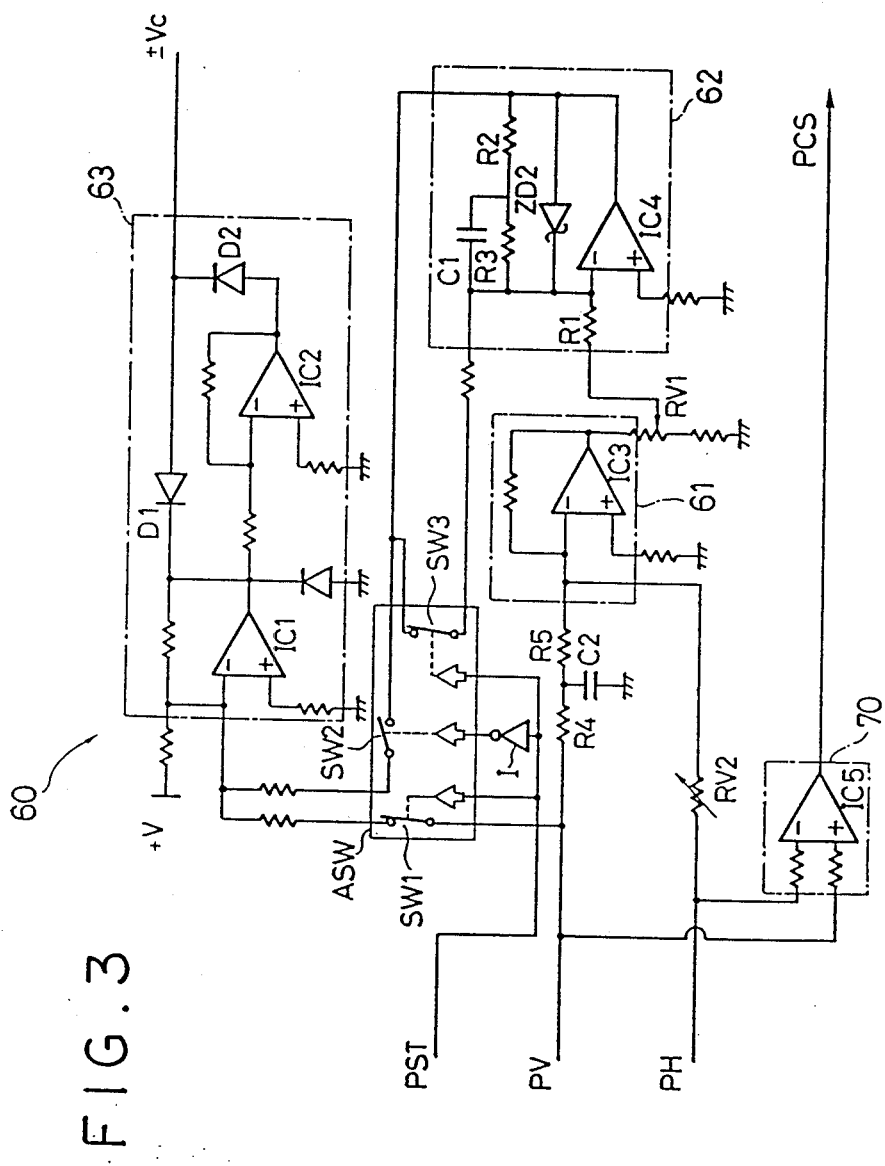
FIG. 3 is a detailed diagram illustrating a pressure feedback circuit and a discrimination circuit shown in FIG. 2.

FIG. 3 illustrates in detail the pressure feedback circuit 60 and discrimination circuit 70. Numeral 61 is a comparator, constituted by an operational amplifier IC3, for comparing the pressure command voltage PV that has been attained by converting the pressure command PL from the CNC 30 into a voltage in the D/A converter 28 (FIG. 2) with the pressure feedback signal PH from the strain gauge amplifier 27 (FIG. 2) to output the difference between these two values. Numeral 62 is an amplification compensator for receiving the output of the comparator 61 through a volume RV1 that determines the gain of the pressure feedback, which compensator is constituted by a Zener diode ZD2 for clamping the output of an operational amplifier IC4 to a constant voltage, a capacitor C1, resistors R1 to R3, etc. The capacitor C1 and resistors R1–R3 are provided to stabilize the pressure feedback. ASW is an analog switch, which switches in response to the select signal PST representing whether or not the pressure feedback control is to be executed and comprises three switches SW1 to SW3. The switches SW1 and SW3 are arranged to cooperate with each other to always take the same ON or OFF position, while the switch SW2 is arranged to take the position opposite to the position of the switch SW1 and SW3. More specifically, when the select command PST is at an L level in the TTL logic level, the switches SW1 and SW3 are turned on and the switch SW2 which has an inverter provided at its previous stage is turned off. When the command PST is at an H level, the switches SW1 and SW3 are turned off with the switch SW2 being on. Numeral 63 is a clamp circuit constituted by two operational amplifiers IC1 and IC2, two diodes D1 and D2, etc. The operational amplifiers IC1 and IC2 constitute an amplifier and a code converter, respectively. A negative voltage input to the operational amplifier IC1 (both of the pressure command voltage PV and the output voltage of the amplification compensator 62 are negative voltages) is amplified in the operational amplifier IC1 and is output as a positive clamp voltage +Vc. The operational amplifier IC2 serving as the code converter converts the voltage +Vc to a negative clamp voltage −Vc and outputs it. That is, when the output of the compensator 54 (see FIG. 2) exceeds the positive clamp voltage +Vc, the diode D1 is rendered conductive and the input voltage to the amplifier 55 does not exceed the clamp voltage +Vc. Similarly, when the output of the compensator 54 falls below the negative clamp voltage −Vc, the diode D2 is rendered conductive so that the input to the amplifier 55 does not fall below the negative clamp voltage −Vc. The voltage +V input to the clamp circuit 63 is used for pull-up operation.

Conventionally, in the torque limit means used for torque control of the servomotor, which is constituted only by this clamp circuit 63, the output of the D/A converter 28 is input to the clamp circuit 63 and the output of the compensator 54 is clamped so that the driving current of the servomotor is controlled, thereby performing the torque control.

The discrimination circuit 70, constituted by an operational amplifier IC5, is adapted to compare the pressure feedback signal PH from the D/A converter 28 with the pressure feedback signal PH from the strain gauge amplifier 27 and output the injection/hold switching signal PCS when the pressure feedback signal PH becomes greater than the pressure command voltage PV.

Resistors R4 and R5 and a capacitor C2 constitute an integrator for relaxing an abrupt change in the pressure command voltage PV (step voltage) upon occurrence of such change. The switch SW3 of the analog switch ASW, when switched on, short-circuits both ends of the capacitor C2 through resistors and discharges the charges built in the capacitor C1.

With the pressure feedback circuit constituted as described above, when the pressure feedback select command PST is in an off state, the switches SW1 and SW3 of the analog switch ASW are turned on and the switch SW2 is turned off, so that the pressure command voltage PV is input as it is to the clamp circuit 63. As a result, the clamp voltage ±Vc corresponding to the pressure command voltage PV is output from the clamp circuit 63. This voltage causes the torque limit. On the other hand, when the pressure feedback select command PST is in an on state, the switches SW1 and SW3 are turned off with the switch SW2 on, so that the output voltage of the amplification compensator 62 is input to the clamp circuit 63. Since the output of the comparator 61 is supplied through the volume RV1 to the amplification compensator 62 and this output represents the result of comparison between the pressure command voltage PV and the pressure feedback signal PH (voltage) that corresponds to the pressure on the resin detected by the strain gauge 26, the output from the amplification compensator 62 is the amplified difference between the pressure command voltage PV corresponding to the pressure command value PL and the pressure feedback signal PH. And the servomotor M is subjected to the torque limit through the clamp circuit 63 which receives the amplified output of the amplification compensator 62, so that the pressure feedback control is executed so as to set the pressure on the resin to a value equal to the pressure command value PL.

Figures 4A, 4B:
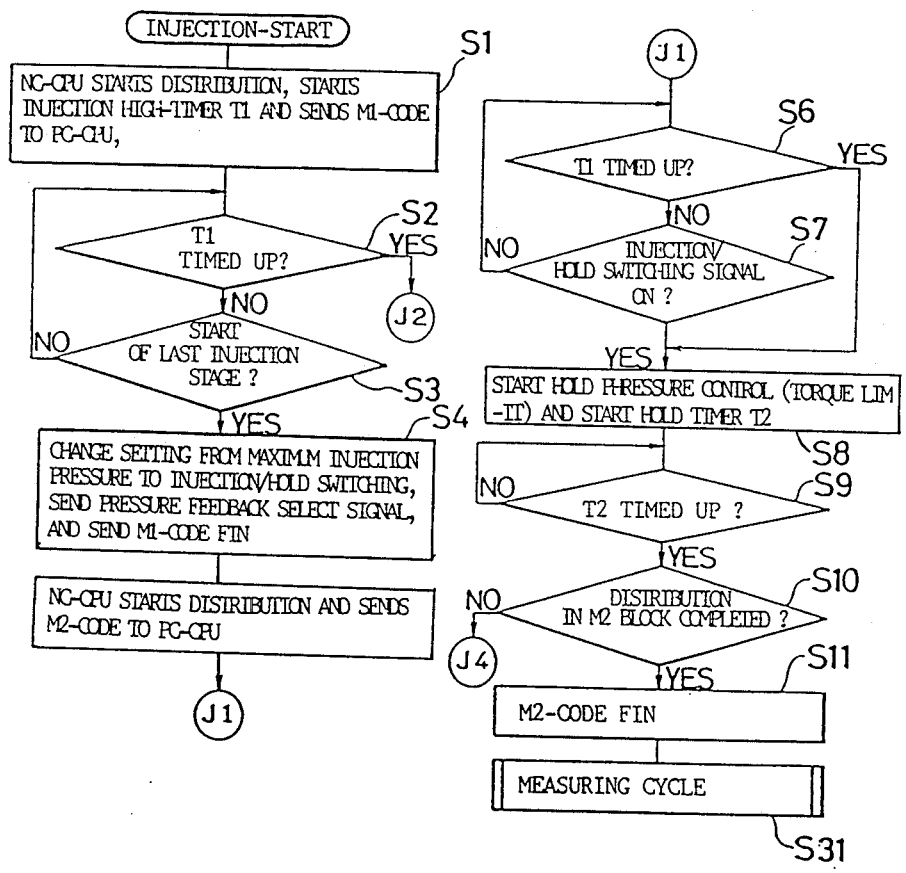
Figures 4C, 4D:
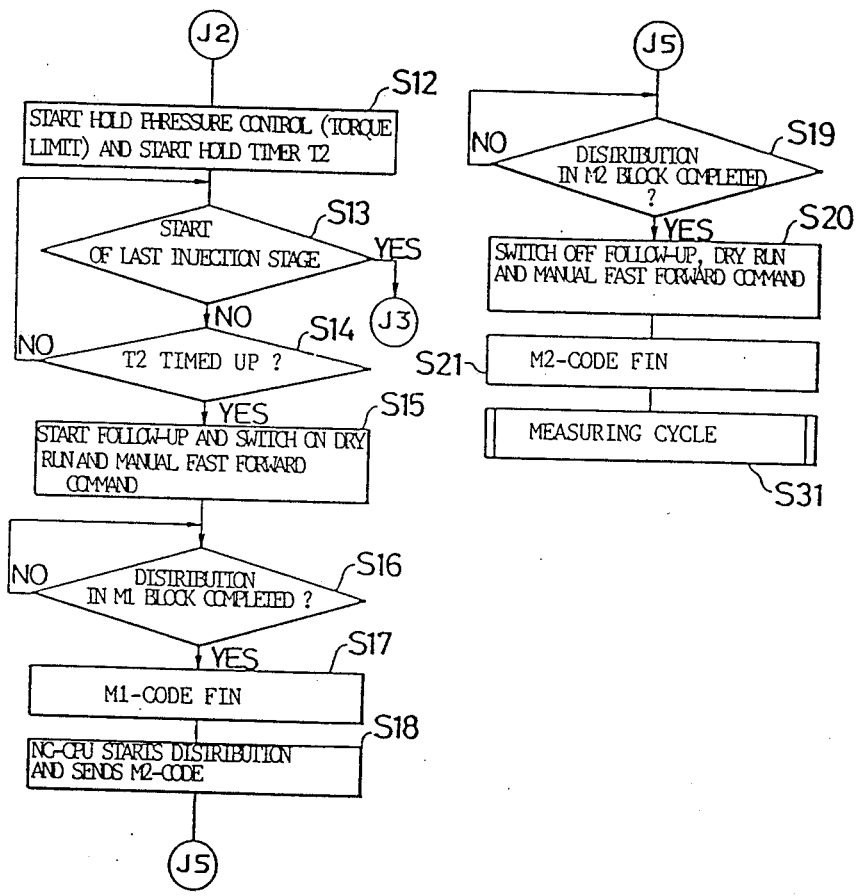

The operation of the injection control apparatus according to this embodiment will now be explained in detail referring to the operation flowchart shown in FIG. 4.

At the start of the injection cycle, the NCCPU 31 starts the pulse distribution and outputs pulse whose number corresponds to the preset injection speed, to the error register 51 of the servo circuit 50 through the servo-interface 35. The error register 51 subtracts the number of pulses detected in the encoder P from the received pulse signal, and outputs the difference as the speed command through the D/A converter 52.

As has been explained earlier with reference to FIG. 2, the servomotor M is driven at the preset injection speed in accordance with the speed command.

The NCCPU 31 also starts the injection high-timer T1 at the start of the injection cycle and outputs an M1-code to the PCCPU 32 (step S1). The preset time for the injection high-timer T1 is set to be slightly greater than an ordinary time needed for the screw to reach the hold end position from the start of the injection. During the injection control operation comprising a plurality of stages, the NCCPU 31 determines whether or not the pulse distribution to the end of the stage previous to the last stage is completed, that is, whether or not the screw has reached the start position of the last stage. If the screw is determined to have reached the start position, the NCCPU 31 outputs the pulse distribution end signal to the BAC 39.

Upon reception of the M1-code, the PCCPU 32 repeatedly determines whether or not the injection high-timer T1 has timed up (step S2) and whether or not the NCCPU 31 has sent the pulse distribution end signal to the BAC 39 (step S3). When the screw reaches the start position of the last injection stage prior to the time-up of the injection high-timer T1, the PCCPU 32 changes the pressure command PL through the output circuit 40 to switch from the maximum injection pressure to the injection/hold switching pressure which is the condition to start the pressure feedback, and outputs the pressure feedback selection command PST and the FIN signal representing the end of the process involving the M1-code to the NCCPU 31 (step S4). The pressure command PL is sent from the PCCPU 32 to the pressure feedback circuit 60 and the discrimination circuit 70 through the D/A converter 28 so that the output torque of the servomotor M is set to be equal to or below the maximum injection pressure during the time interval between the start of the injection and the start of the last injection stage. At this time, since the pressure feedback select command has not been output yet, the pressure command voltage PV from the D/A converter 28 is input through the switch SW1 of the analog switch ASW to the clamp circuit 63 which in turn outputs the clamp voltage ±Vc corresponding to the maximum injection pressure. As a result, the torque command of the compensator 54 is subjected to the torque limit control to make the injection pressure equal to or below the maximum injection pressure.

As described above, the pressure command voltage PV is input to the discrimination circuit 70 before the the start of the last injection stage is reached. And this voltage PV is compared with the pressure feedback signal PH from the strain gauge amplifier 27. Since the pressure command voltage PV here is a large voltage corresponding to the maximum injection pressure, the injection/hold switching signal PCS is not output from the discrimination circuit 70. However, when the pressure feedback select command PST is sent as the last injection stage is reached, the switches SW1 and SW3 of the analog switch ASW are turned off with the switch SW2 being on. Consequently, the clamp voltage ±Vc is output from the clamp circuit 63 in accordance with the difference between the pressure command voltage PV and the pressure feedback signal PH, and the feedback control is executed so as to set the pressure applied on the resin to be the set pressure command value PL.

Then, upon reception of the end signal FIN corresponding to the M1-code from the PCCPU 32, the NCCPU 31 starts the pulse distribution for the next block and sends an M2-code to the PCCPU 32 (step S5). Upon reception of the M2-code, the PCCPU 32 repeatedly discriminates whether or not the injection high-timer T1 has timed up (step S6) and whether or not the injection/hold switching signal PCS is in an on state (step S7). When it is determined that either the injection high-timer T1 has timed up or the injection/hold switching signal PCS is in the on state, the process advances to the next step S8 where the pressure control is executed.

The switching from the injection control to the hold pressure control at the time the injection high-timer T1 has timed up is executed even in the last stage of the injection control if the injection continues over an excess period of time from the start of the injection. That is, the injection/hold switching in this case is executed using the time elapsed from the start of the injection as a parameter. The same switching operation may be executed before the control process advances to the last injection control stage, as will be described later referring to the step S12.

The switching operation due to the injection/hold switching signal PCS being in the on state starts when the discrimination circuit 70 determines that the pressure feedback signal representing the actual resin pressure is greater than the voltage PV corresponding to the pressure command PL in the pressure feedback control that has started in the step S4. According to this pressure feedback control, the output torque of the servomotor M is controlled by the feedback circuit 60 so that the pressure command voltage PV coincides with the pressure feedback signal PH from the strain gauge amplifier 27. And when the resin pressure reaches the injection/hold switching pressure, the pressure feedback signal PH becomes equal to the pressure command voltage PV or becomes greater through overshooting. At this time the discrimination circuit 70 outputs the injection/hold switching signal PCS. The PCCPU 32 detects when the injection/hold switching signal PCS is in the on state and starts the hold pressure control of the step S8. More specifically, as described earlier, the PCCPU 32 outputs the preset hold pressure value as the pressure command PL, and the pressure feedback circuit 60 receives the pressure command voltage PV that is this pressure command PL converted into an analog voltage in the D/A converter 28 and thus controls the pressure applied on the resin to a value equal to the set pressure. Meanwhile, the PCCPU 32 starts the hold pressure control, and starts the hold timer T2 and waits for the timer T2 to time up (step S9). (The time-out period of the hold timer T2 is set to be slightly greater than an ordinary time needed for the screw to reach the hold end position.) When the time-up of the timer T2 occurs, the PCCPU 32 determines whether or not the distribution end signal indicating the end of the pulse distribution to the hold end position in the M2 block is output from the NCCPU 31 (step S10), and if the decision is affirmative, the PCCPU 32 outputs the FIN signal indicating the end of the processing for the M2-code (step S11) and then advances to the next measuring cycle (step S31).

If the distribution end signal is determined not to have been output yet in the step S10, the process advances to the step S27 where the PCCPU 32 starts the follow-up function and turns on the dry run function to set a manual fast forward command on (manual rapid feed command is on). As a result, the NCCPU 31 reads out the content of the error register 51 that stores the difference between the speed command value of the servo circuit 50 and the signal from the position detector P of the servomotor M and outputs a pulse signal in such a way as to set the stored value to be zero (follow-up operation) and outputs to the error register 51 the remaining distribution pulses that correspond to the interval between the screw position at the time-up of the timer T2 and the screw position at the end of the hold pressure, at a speed corresponding to the rapid feed rate. Consequently, although the screw has not actually reached the hold end position, the pulse distribution is forcibly executed. Thereafter, when the pulse distribution to the hold end point in the M2 block is forcibly completed, the NCCPU 31 sends the distribution end signal to the PCCPU 32 (step S28), which in turn switches off the follow-up function, dry run function and the manual fast forward command (step S29) and sends the end signal FIN for the M2-code to the NCCPU 31 (step S30). As a result, the NC unit, which is generally constituted in such a way that it cannot advance its control operation to the next block unless the pulse distribution is completed in any block, can advance to the next block and the control operation of the NC unit advances to the next measuring cycle (step S31).

Then, if in the steps S2 and S3 it is determined that the injection high-timer T1 has timed up before the start of the last injection stage is reached, the process advances to the step S12 where the PCCPU 32 starts the hold pressure control and then starts the hold timer T2 as well. That is, as described earlier, the pressure command PL corresponding to the set hold pressure is output so that the torque output of the servomotor M is subjected to the feedback control to set the resin pressure to the set hold pressure. And the PCCPU 32 repeatedly determines whether or not the signal representing the end of the pulse distribution to the start of the last injection stage is output from the NCCPU 31 (step S13) or whether or not the hold timer T2 has timed up (step S14). When the screw reaches the start of the last injection stage prior to the time-up of the hold timer T2, the process advances to the step S22. On the other hand, when the time-up of the hold timer T2 occurs before the screw reaches the same start position, the process advances to the step S15. In the step S15 the PCCPU 32 starts the follow-up function and switches on the dry run function and the manual fast forward command, and the NCCPU 31 executes the forced pulse distribution as has been done in the step S29. Thereafter, when the NCCPU 31 completes the pulse distribution to the start of the last injection stage, it sends the pulse distribution end signal to the PCCPU 32. Upon reception of this distribution end signal (step S16), the PCCPU 32 sends the FIN signal indicating the end of the process for the M1-code (step 17) to the NCCPU 31. Upon reception of this FIN signal, the NCCPU 31 starts the pulse distribution for the next M2 block and sends the M2-code to the PCCPU 32 (step S18). As the follow-up function, dry run function and manual fast forward command are turned on in the step S15, the NCCPU 31 forcibly executes the pulse distribution and outputs the pulse distribution end signal when the pulse distribution to the hold end position for the M2 block is completed. In response to this pulse distribution end signal (step S19), the PCCPU 32 switches off the follow-up function, dry run function and manual fast forward command (step S20) and sends the FIN signal indicating the end of the process for the M2-code to the NCCPU 31 (step S21). As a result, the injection and hold controls are completed and the process advances to the next measuring cycle.

When the screw reaches the start of the last injection stage prior to the time-up of the hold timer T2 in the steps S13 and S14, the process advances to the step S22 where the PCCPU 32 sends to the NCCPU 31 the FIN signal representing the end of the process for the M1-code, namely, the end of the injection control process to the start of the last injection stage. In response to the FIN signal, the NCCPU 31 starts the pulse distribution for the next block M2 and sends the M2-code to the PCCPU 32 (step S23). Upon reception of this M2-code, the PCCPU 32 enters the operation to monitor the time-up of the hold timer T2 (step S24), and, when the timer's time-up is confirmed, it determines whether or not the signal representing the end of the pulse distribution to the hold end position for the M2 block is sent from the NCCPU 31 (step S25) and sends to the NCCPU 31 the FIN signal representing the end of the hold process for the M2-code upon generation of the pulse distribution end signal (step S26). This completes the injection/hold pressure control and the process then advances to the next measuring cycle (step 31). If it is determined in the step S25 that the pulse distribution is not completed, the process advances to the step S27 where as described earlier, the forcible pulse distribution to the hold end position is executed. Then, the process advances to the next measuring cycle (steps S27 to S31).

We claim:

1. An injection control apparatus for an injection-molding machine for performing injection control using a servomotor, said apparatus comprising:
   a servo circuit including an error register;
   a numeric control unit outputting pulse trains to perform injection control and hold pressure control including a move command signal which is delivered to the error register, wherein a pulse distributor corresponding to hold pressure control is started upon completion of a pulse distribution corresponding to injection control;
   means for stopping operation of the injection molding machine when an excessive move command is accumulated in the error register;
   pressure detection means for detecting injection pressure and outputting a pressure signal;
   injection high-timer means having an injection high-timer, for counting a predetermined time after an injection cycle starts and outputting a time-up signal upon elapse of said predetermined time;
   comparison means for comparing said pressure signal detected by said pressure detection means with a stored preset pressure signal and outputting an output signal when said detected pressure signal is higher than said preset pressure signal;
   hold pressure control means for starting hold pressure control in response to said time-up signal from said injection high-timer or said output signal from said comparison means; and
   means connected to the error register when a pulse distribution to a hold end position is not completed at the time said hold pressure control is completed, so thereby completing said pulse distribution.

2. An injection control apparatus according to claim 1, wherein said hold pressure control means has a timer for measuring a second predetermined time from the start of said hold pressure control and outputting a second time-up signal when said second predetermined time is measured, and wherein said old pressure control is completed upon generation of said second time-up signal or completion of pulse distribution to said hold end position.

3. An injection control apparatus according to claim 1, wherein said pressure detection means is a pressure sensor insertable in said mold.

4. An injection control apparatus according to claim 1, wherein said pressure detection means comprises a strain gauge provided at a connection area between a screw and driving means for driving said screw in an axial direction thereof during an injection operation.

5. An injection control apparatus according to claim 2, wherein said pressure detection means is a pressure sensor to be inserted in said mold.

6. An injection control apparatus according to claim 2, wherein said pressure detection means comprises a strain gauge provided at a connection area between a screw and driving means for driving said screw in an axial direction thereof during an injection operation.

7. An injection control apparatus according to claim 1, wherein the injection high-timer includes means for outputting an injection control pulse distribution, at a frequency corresponding to a preset injection speed, to the servomotor as a control signal.

8. An injection control apparatus according to claim 5, wherein the injection high-timer means includes storage means for storing preset pressure command signals corresponding to preset injection speeds.

9. An injection control apparatus according to claim 5, wherein the injection high-timer means includes means for starting the injection high-timer counting at a start of the injection cycle.

10. An injection control apparatus according to claim 5, wherein the injection high-timer means includes means for determining when a screw of the injection-molding machine reaches a start position of the last injection cycle stage and means for outputting a pulse distribution end signal upon reading the start position of the last injection cycle stage.

11. An injection control apparatus according to claim 5, wherein the injection high-timer means includes means for determining when the injection high-timer has timed-up and means for determining when the pulse distribution end signal is outputted.

12. An injection control apparatus according to claim 8, wherein the hold pressure control means includes means for changing the injection pressure control pulse distribution to a hold pressure pulse distributor and means for outputting a pressure feedback command signal and finish signal, and means for starting a succeeding injection cycle upon receipt of the finish signal.

13. An injection control apparatus according to claim 1, wherein the comparison means comprises a discriminator circuit.

* * * * *